Oct. 27, 1959 E. E. RUSH 2,910,516
FRACTIONAL CRYSTALLIZATION PROCESS AND APPARATUS
Filed Aug. 20, 1953 3 Sheets-Sheet 1

INVENTOR.
E. E. RUSH
BY Hudson & Young
ATTORNEYS

INVENTOR.
E. E. RUSH
BY Hudson and Young
ATTORNEYS

INVENTOR.
E. E. RUSH

United States Patent Office 2,910,516
Patented Oct. 27, 1959

2,910,516

FRACTIONAL CRYSTALLIZATION PROCESS AND APPARATUS

Elton E. Rush, McGregor, Tex., assignor to Phillips Petroleum Company, a corporation of Delaware Application August 20, 1953, Serial No. 375,516

19 Claims. (Cl. 260—674)

This invention relates to the separation and purification of components of a liquid multi-component mixture. In one of its more specific aspects, it relates to the separation and purification of components of a liquid multi-component mixture by crystallization. In another of its more specific aspects, it relates to the separation and purification of a hydrocarbon from a mixture containing other hydrocarbons. In still another of its more specific aspects, it relates to a method of controlling the concentration of a liquid multi-component mixture. In yet another of its more specific aspects, it relates to a method and apparatus for crystal separation and purification from liquid multi-component mixtures.

The separation of chemical compounds by means of crystallization finds many applications in industrial installations. While separation by distillation or solvent extraction seems to be generally preferred, there are cases where these methods are impracticable or impossible, and the desired separation can be effected only by means of crystallization. Thus, when confronted with chemical isomers having similar boiling points and solubilities, or with materials having relatively high boiling ranges, or with thermally unstable substances, or with solutions containing both volatile and non-volatile impurities or undesired constituents, separation by crystallization may well be the only method which can be advantageously employed.

As well as offering perhaps the only practicable method of separation, the crystallization method offers the further advantage of being the only separation method which theoretically gives a pure product in a single stage of operation. Accordingly, while distillation and extraction methods in theory would require infinite stages for a pure product, only one crystallization stage should be required because crystals separating from a solution are presumed to have a definite composition. In actual practice, however, the crystals obtained from a solution of several components will be impure because of the occlusion of mother liquor within the crystal interstices. In the conventional fractional crystallization processes, the crystal yield from one batch crystallization is redissolved in a solvent or remelted and again crystallized to effect further purification. The recrystallized product will have less impurity since the concentration of impurity in the new liquor is less than in the previous liquor of crystallization. Such processes require a large amount of equipment and floor space for their operation with resulting high operating expenditures in terms of labor and equipment costs. Furthermore, in these types of processes, the purity of the product is limited by the number of stages through which the crystallization is carried.

More recently, a continuous method of separating and purifying liquid multi-component mixtures has been advanced, as disclosed in U.S. Patent No. 2,617,274, which overcomes the disadvantages of the conventional fractional crystallization processes. This method involves cooling a liquid multi-component mixture from which the separation is to be made so as to form crystals of at least the higher melting component and thereafter separating them from the mother liquor. The crystals are then introduced into a purification column in one end of which a melting section is maintained. By mechanical means, the crystals are moved in a compact, contiguous mass toward the melting section in the purification column where the crystals are melted. A portion of the melt is withdrawn as product while the remainder is forced countercurrently to the movement of crystals and in intimate contact therewith so as to remove therefrom the occluded impurities. While this method of separation and purification is effective in producing a high purity product, it has been found that comparable results can be obtained by a method and apparatus which simplifies materially the operation of the above described process.

The objects of this invention will be attained by the various aspects of the invention.

It is an object of the present invention to provide an improved continuous process for the separation of multi-component mixtures.

Another object of the invention is to provide a process and apparatus for the separation and purification of multi-component mixtures by crystallization.

A further object of the invention is to provide a process for the separation and purification of a hydrocarbon from a mixture containing other hydrocarbons.

A still further object of the invention is to provide an improved process for concentrating dilute solutions.

Still other objects and advantages will become apparent to those skilled in the art from the following disclosure.

In accordance with an application of the present invention, a liquid multi-component mixture containing components of different melting points, one of which crystallizes first upon lowering the temperature of the mixture so as to form crystals contaminated with at least one other component, is introduced under pressure into an upright, elongated, enclosed column. The liquid mixture is passed through a cooling zone disposed in the upper portion of the column where it is cooled to a temperature such as to form a slurry of crystals of the component having the highest melting point and mother liquor. The crystals are then separated from the mother liquor, and thereafter moved downwardly through a purification zone as a uniform, contiguous mass by the combination of gravity and the hydraulic force exerted by the liquid entering the upright column. A melting zone is maintained in the lower end of the purification zone at a temperature at least as high as the melting point of the crystals. On entering the melting zone, the crystals are melted, and a portion of the resulting liquid is withdrawn as product. The remainder of the liquid is displaced upwardly countercurrently to the downward movement of crystals and in intimate contact therewith so as to remove the occluded impurities therefrom.

The process and apparatus of this invention are applicable to a vast number of simple binary and complex multi-component systems. The invention is particularly applicable to the separation of hydrocarbons which have practically the same boiling points, and are, therefore, difficult to separate by distillation. Where high boiling organic compounds are concerned, separation by distillation is often undesirable because many such compounds are unstable at high temperatures. Specific examples of organic systems to which this invention is applicable are recited in U.S. application, Serial No. 166,992, filed June 9, 1950, now U.S. Patent Number 2,747,001, and of particular importance, there may be mentioned separation of systems containing xylenes, systems containing cyclohexane, systems containing normal paraffins, and systems containing benzene, and the like. Thus, it has been found that para-xylene can be separated from a multi-component mixture comprising isomeric alkyl benzenes, that benzene can be separated from a mixture comprising a paraffinic hydrocarbon and benzene, and that cyclohexane can be separated from a mixture comprising a paraffinic hydrocarbon and cyclohexane. Other organic chemicals that may be mentioned include pyridines, dimethylphthalates and fatty acids.

It is not intended, however, to limit the invention to organic mixtures, but rather it is applicable to inorganic mixtures as well, and offers a practical method of separating two inorganic components between which solvates or hydrates are formed. Examples of inorganic systems to which this invention is applicable are those for the recovery of pure salts, such as ammonium nitrate, and of anhydrous salts from their hydrates.

In certain cases, it may also be desirable to recover the mother liquor separated from the crystals as a product of the process. This situation arises where it is desired to increase the concentration of a dilute solution. This aspect of the invention is especially applicable to the production of concentrated food products which involves primarily the removal of water from these products. Accordingly, by utilizing the process of this invention, water can be removed from fruit juices such as grape, orange, lemon, pineapple, apple and tomato. It is also possible to concentrate vegetable juices and beverages such as milk, beer, wine, coffee and tea by this method. The desired degree of concentration can be closely controlled by varying the amount of liquid passed upwardly through the downwardly moving mass of crystals. This aspect of this invention is in general applicable in those instances where it is desired to increase the concentration of a solution by removing at least a portion of the solvent therefrom.

For a more complete understanding of the invention, reference may be had to the drawing, in which.

Figure 1:
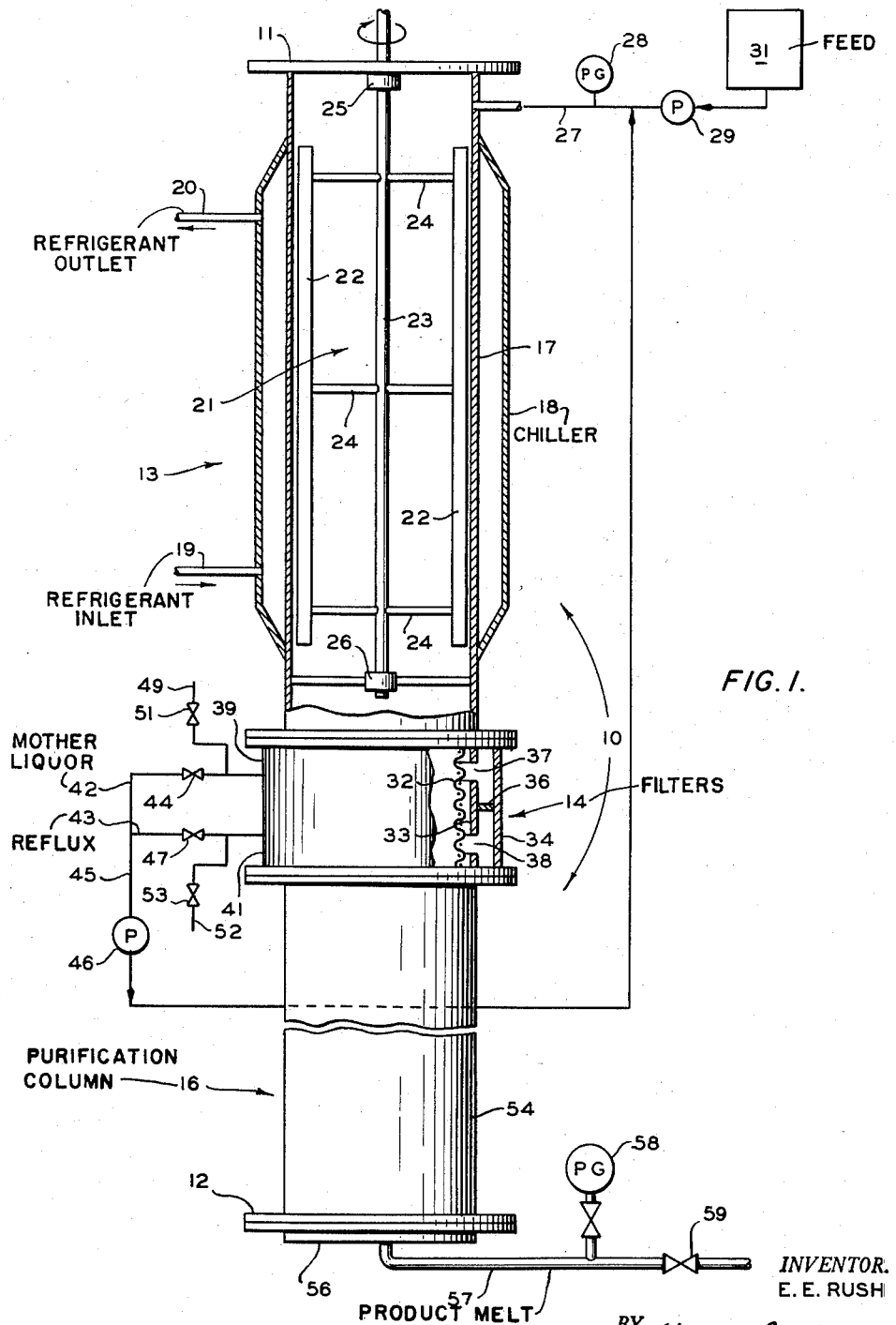
Figure 1 is a diagrammatic illustration of an elevational view, partly in section, of one modification of the apparatus of the invention.

Referring to the drawing and in particular to Figure 1, an upright elongated column 10 is provided with upper and lower closure members 11 and 12, respectively, and is divided into three principal sections, namely, a scraped surface chiller 13, a filter section 14, and a crystal purification column 16. Scraped surface chiller 13 comprises a tubular member 17 provided with refrigeration means such as an annular jacket 18 which is provided with refrigerant inlet line 19 and refrigerant outlet line 20 whereby refrigerant is introduced into and withdrawn from the annular space between tubular member 17 and jacket 18. Scraper 21 which comprises a plurality of blades 22 attached to vertical shaft 23 by a series of cross members 24 is supported within tubular member 17 by means of upper and lower bearings 25 and 26, respectively. Cross members 24 and lower bearing 26 are constructed so as not to impede the flow of liquid and crystals through the chiller and may be in the form of a spider. Shaft 23 extends through upper closure member 11 and is operatively connected to a motor, not shown, thus providing means for rotating the scraper blades. Feed inlet line 27, communicating with the upper end of tubular member 17, contains a pressure gage 28 and a feed pump 29, and is connected to a source 31 of feed material.

Filter section 14 disposed immediately below scraped surface chiller 13 and connected thereto, comprises a filter screen 32, substantially cylindrical in shape, positioned within tube 33 which in turn is surrounded by jacket 34. Filter screen 32 is preferably made of wire screening of a fineness of 30 to 150-mesh so as to permit liquid to pass therethrough while retaining the crystals. The annular section between tube 33 and jacket 34 is divided into an upper and a lower part by ring member 36. Tube 33 is perforated such as by an upper row of holes 37 and a lower row of holes 38, the holes being spaced around the circumference of the tube near its bottom and top. By this arrangement of elements as described, filter section 14 is in effect divided into upper and lower filters 39 and 41, respectively. Line 42 provides means for withdrawing lower melting product or mother liquor from upper filter 39 while line 43 connects with lower filter 41 for withdrawal of the reflux stream. Lines 42 and 43, containing valves 44 and 46, respectively, are connected to line 45 provided with pump 46 for recycling any desired portion of the mother liquor and the reflux stream to the top of scraped surface chiller 13 through line 27. Line 49 containing valve 51 and line 52 containing valve 53 are connected to lines 42 and 43, respectively, and provide means for withdrawing liquid which it is not desired to recycle. It is also within the contemplation of this invention to utilize a single filter instead of upper and lower filters 39 and 41 in which case the mother liquor and the reflux stream are withdrawn through the same line.

Crystal purification column 16 is connected to filter section 14 and comprises vertical tube 54 closed at its lower end by closure member 12. A heat exchange means is provided at the lower end of column 16 in order to maintain a relatively high temperature at that end. As illustrated, the heat exchange means is an electrical heater 56 positioned next to closure member 12, but other means may be employed. For example, a coil through which a heat transfer medium is circulated can be disposed within or around column 16 at its lower end, or an electric bayonet type heater may be provided to extend into the end of the purification column. Outlet line 57 connected to the lower end of column 16 and containing pressure gage 58 and valve 59 provides means for withdrawing a controlled amount of higher melting product from the column.

Figure 2:
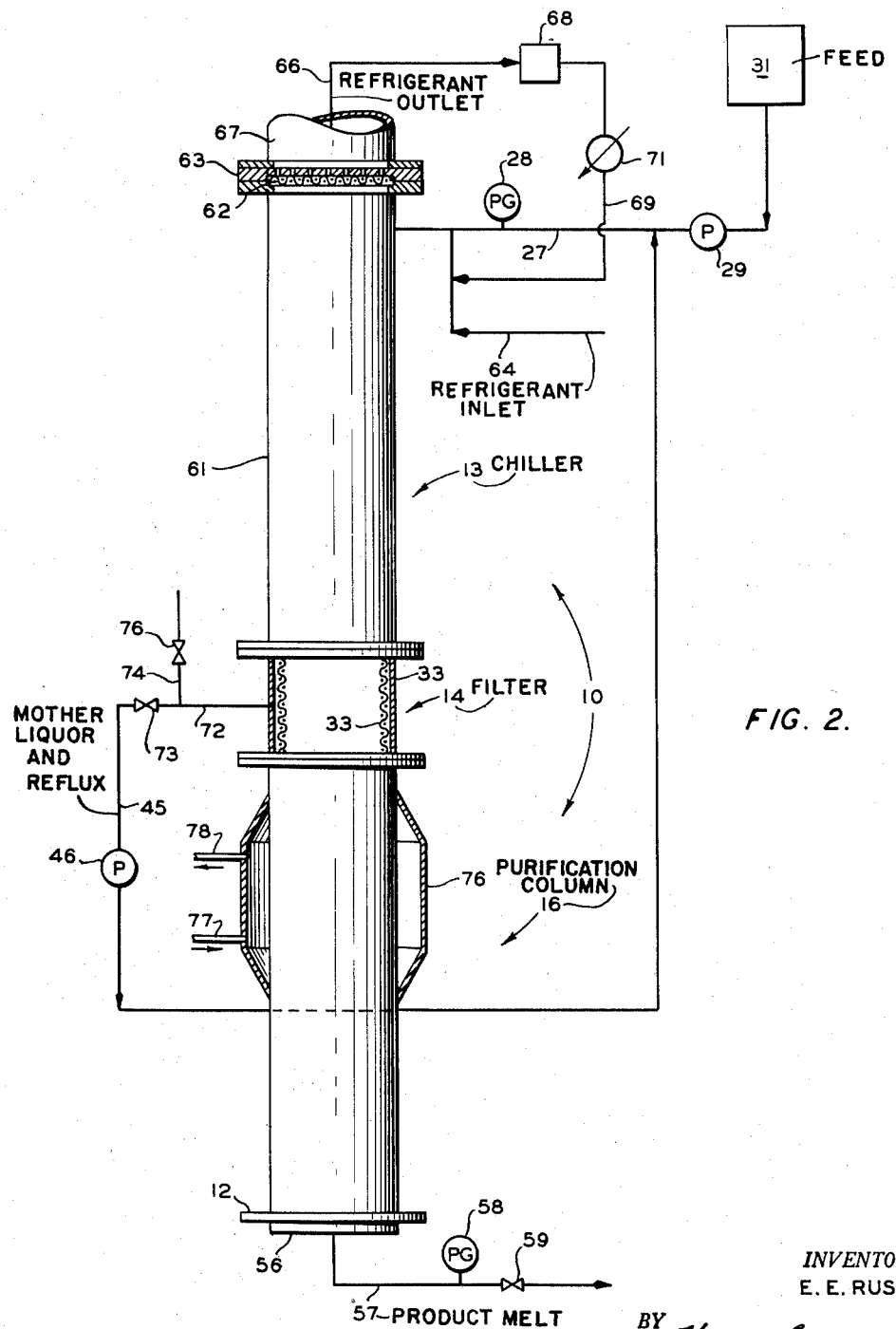
Figure 2 is a diagrammatic elevational view of another modification of the apparatus of the invention.

In a modification of the invention as shown in Figure 2, chiller 13 comprises tubular member 61 fitted at its upper end with wire screening 62 and perforated plate 63. Refrigerant inlet line 64 is connected to feed inlet line 27, thereby providing means for introducing the feed and the refrigerant together into the upper portion of chiller 13. Line 66 connected to vertical tube 67, which is disposed above plate 63, provides means for withdrawing the refrigerant from chiller 13 and for introducing same into compressor 68. Refrigerant recycle line 69 leads from compressor 68 to refrigerant inlet line 64 and contains cooler 71. By utilizing this modified cooling system as described, it is possible to eliminate the means for scraping the crystals from the walls of the chiller as illustrated in Figure 1. It is to be understood, however, that it is within the contemplation of the invention to use a scraping means in this modification of the invention.

In the apparatus of Figure 2, filter section 14 comprises filter screen 32 positioned within tube 33, thus providing a single filter as contrasted with the double filter of Figure 1. It is to be understood, however, that the double filter of Figure 1 can be used in this modification of the invention. Line 72, containing valve 73, provides means for withdrawing the mother liquor and the reflux stream from the filter and is connected to recycle line 45. Line 74, provided with valve 76, is connected to line 72 for withdrawal of liquid which it is not desired to recycle. Crystal purification column 16 is provided with a heating means such as jacket 76 which has connected thereto inlet line 77 and outlet line 78 whereby a heat transfer fluid can be introduced into and withdrawn from the annular space between column 16 and jacket 76. Identical numerals have been used to designate elements corresponding to those described in conjunction with Figure 1.

Figure 3:
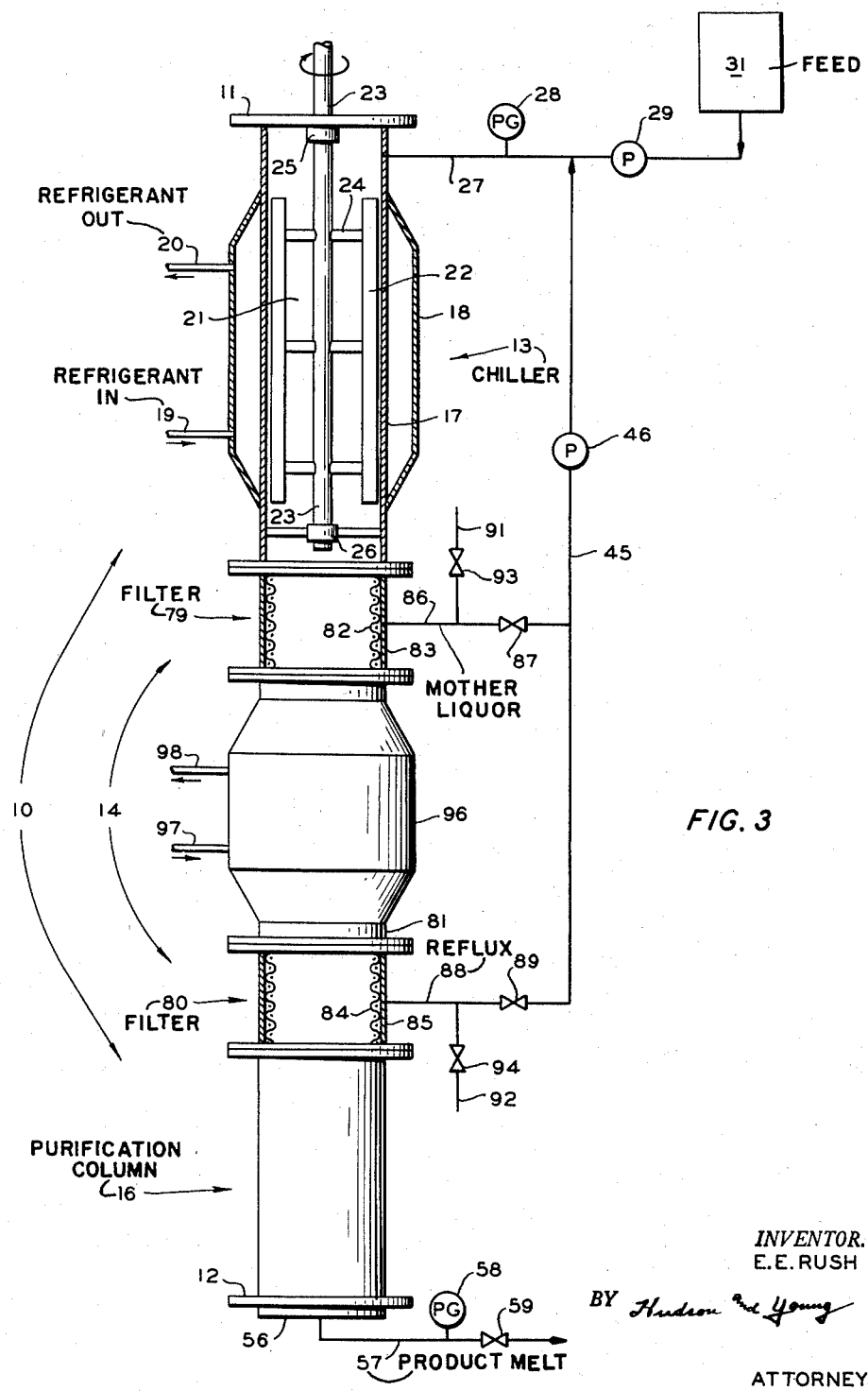
Figure 3 is a diagrammatic elevational view of still another modification of the apparatus of the invention.

In the modification of the invention as illustrated in Figure 3, filter section 14 comprises upper and lower filters 79 and 80, respectively separated by the tubular member 81. Upper filter 79 comprises a filter screen 82 positioned within tube 83 while lower filter 80 comprises a filter screen 84 disposed within tube 85. Line 86 containing valve 87 provides means for withdrawing lower melting product or mother liquor from upper filter 79 while line 88 containing valve 89 connects with lower filter 80 for withdrawal of the reflux stream. Lines 86 and 87 are connected to recycle line 45 while lines 91 and 92 containing valves 93 and 94, respectively provide means for withdrawal of liquid it is not desired to recycle. Tubular member 81 is provided with a heating means such as annular jacket 96 which has connected thereto inlet line 97 and outlet line 98 whereby a heat transfer fluid can be introduced into and withdrawn from the annular space between tubular member 81 and jacket 96. Other elements of Figure 3 are similar to those described in conjunction with Figure 1, and identical minerals have been used to designate such elements. As illustrated in Figure 3, the heating means is located between the mother liquor and reflux filters, but it is to be understood that heat can be applied to the walls of the crystal purification column either upstream or downstream from the reflux filter in order to prevent the walls from becoming dry and causing the crystal mass to stick in the column.

In the operation of the apparatus of Figure 1, a feed mixture from source 31, which may be a liquid multicomponent mixture, one component of which crystallizes first upon lowering the temperature of the mixture so as to form crystals contaminated with at least one other component, is introduced through line 27 into scraped surface chiller 13 under hydraulic pressure developed by feed pump 29. Refrigerant is passed into the annular space between tubular member 17 and annular jacket 18 through line 19 and withdrawn therefrom through line 20 at a rate sufficient to maintain scraped chiller 13 at a temperature low enough to crystallize one of the components. The feed mixture fills the entire length of elongated column 10, and a superatmospheric pressure is maintained at the top of chiller 13 through the operation of pump 29. Because of the low chiller temperature, crystals of one component are frozen out, thus forming a slurry of crystals and mother liquor. Scraper 21 is slowly rotated in order to remove any crystals forming on the walls of tubular member 17. It is also within the scope of this invention to pre-cool the feed mixture prior to introduction into the scraped surface chiller. By operating in this manner, the heat transfer necessary to form crystals within the chiller can be decreased. The slurry of mother liquor and crystals flows downwardly through chiller 13 and enters filter section 14 where the crystals are separated from the mother liquor or lower melting product by removal of the liquid from upper filter 39 through line 42. The crystals, together with occluded impurities, then enter crystal purification column 16, displacing the liquid therein and forming a uniform, contiguous mass of crystals. By means of heater 56 the lower end of crystal purification column 16 is maintained at a temperature at least as high as the melting point of the crystals. The mass of crystals is moved downwardly through column 16 toward the high temperature end by the combination of the force of gravity and the hydraulic force exerted by the feed mixture entering the top of column 10. On reaching the high temperature end of column 16, the crystals are melted and a portion only of the resulting liquid is withdrawn through line 57 as product while the remainder of the liquid is displaced upwardly as a reflux stream through the downwardly moving mass of crystals and in intimate contact therewith. The reflux stream is removed from column 10 through lower filter 41 by means of line 43.

The reflux stream passes countercurrently to the movement of crystals through the combined effect of withdrawing only a portion of the liquid from the purification column 16 and the liquid displacing action of the uniform, contiguous mass of crystals moving downwardly as a result of the force of gravity and the hydraulic force exerted by the liquid mixture introduced into column 10. The high purity of product obtainable is due primarily to the washing action of the reflux stream passing upwardly through the column in intimate contact with the crystals. The amount of reflux which is required to produce a higher melting product of 99+% purity will depend upon the physical and chemical characteristics of the crystals and the amount of occluded impurities therein. While it is preferred to maintain the amount of reflux in the range of 10 to 50% of the liquid resulting from melting the crystals, it is possible to operate with a reflux as low as 5% and as high as 60% or greater in some instances.

Provision is made for recycling a desired portion of the reflux stream and/or the lower melting product to the feed inlet line. Thus, a controlled amount of reflux and lower melting product is passed into line 45 and thereafter introduced into feed inlet line 27 under pressure developed by pump 46. In this manner the volume of liquid entering scraped surface chiller 13 is increased, thereby resulting in a greater hydraulic force being exerted upon the mass of crystals.

When practicing the process of this invention utilizing the chiller of Figure 2, a liquid refrigerant, such as propane, is introduced into feed inlet line 27 through line 64 so that both feed material and refrigerant enter chiller 13 together. The liquid feed is cooled forming crystals of one component by the evaporation of the refrigerant which passes from the chiller through wire screening 62 and perforated plate 63. The vaporous refrigerant thereafter enters compressor 68 through line 66 where it is compressed to a liquid. After leaving compressor 68, the liquid refrigerant is cooled in cooler 71 and thereafter recycled through line 69 to refrigerant inlet line 64. The apparatus thereafter operates in the same manner as described in conjunction with Figure 1. If the crystal mass in moving downwardly through column 16 should tend to stick therein, heat can be applied to the walls of the column by introducing a heat transfer fluid such as heated air or steam into the annular space between column 16 and jacket 76. The walls of the column are thereby prevented from becoming dry, and the crystal mass can move freely through the column.

The operation of the apparatus of Figure 3 is very similar to that as described in relation to Figure 1. The slurry of mother liquor and crystals flows downwardly through chiller 13 and enters filter section 14 where the crystals are separated from the mother liquor by removal of the liquid from upper filter 79 through line 86. The crystals then enter tubular member 81 and pass downwardly through lower filter 81 into crystal purification column 16, forming a uniform contiguous mass of crystals therein. The reflux stream formed by displacing a portion of the melt upwardly through the crystal mass is withdrawn from the column through lower filter 81. If the crystals in moving downwardly through the column should tend to stick in tubular member 81, and thereby prevent further movement of crystals into the purification column, a heat transfer fluid such as heated air or steam can be introduced into the annular space between tubular member 81 and jacket 93 through line 97 and withdrawn therefrom through outlet line 98. By operating in this manner, the column is heated and in effect lubricated so that the crystal mass can be effectively moved through the column by the combination of the force of gravity and the hydraulic force exerted by the feed mixture entering the top of column 10.

The following illustrative example, which is not intended to unduly limit the scope of the invention, will provide a more comprehensive conception of the invention.

For this example, a two-component hydrocarbon feed mixture consisting of 62 weight percent benzene and the balance n-heptane was introduced into the scraped surface chiller. A slurry of benzene crystals and mother liquor was formed in the chiller and flowed into the filter section where the mother liquor was withdrawn. A temperature of about −44° F. was maintained in the chiller by expanding propane into the jacket at atmospheric pressure. A uniform, contiguous mass of crystals moved down the crystal purification column countercurrent to a reflux stream flowing up the column from the melting zone. A summary of the experimental data obtained from representative runs is given in the following table:

| Run Number | Length of Run, Hours | Feed Rate, Gallons Per Hour | Composition, Wt. Percent Benzene | |
|---|---|---|---|---|
| | | | Lower Melting Product | Higher Melting Product |
| 3 | 0.8 | 4.26 | 56.0 | 99.0 |
| 4 | 2.2 | 4.38 | 46.5 | 99.0 |
| 18 | 1.0 | 3.41 | 44.0 | 99.0 |
| 19 | 2.0 | 8.81 | 51.0 | 99.9 |

By thus carrying out the separation and purification of a liquid mixture, it is possible to obtain a high purity product. It is to be understood that it is not intended to limit this invention to the recovery of the higher melting product, but it is within the contemplation of this invention to concentrate weak solutions in which case the mother liquor will be recovered as product. While the fractional crystallization apparatus of this invention has been described and illustrated as comprising a substantially vertical cylindrical column of uniform cross-section, it is not intended to so limit the invention. Thus, the cross-sectional areas of the chiller, the filter section, and the purification column may be of varying sizes without departing from the spirit or scope of the invention. Furthermore, it is within the scope of the present invention to operate the apparatuses of Figures 1, 2 and 3 in an inverted position so that the melting zone is disposed in the upper end of the column while the cooling zone is maintained in the lower end of the column. This latter method of operation can be advantageously employed in the separation and purification of crystals which are lighter than the displaced liquid and, therefore, have a tendency to rise in the column countercurrent to the gravitating flow of such liquid. For example, since ice is lighter than water, the fractional crystallization apparatus can be operated in an inverted position when concentrating aqueous solutions such as fruit juices.

As will be evident to those skilled in the art, various modifications of this invention can be made or followed in the light of the foregoing disclosure and discussion without departing from the spirit or scope of the invention.

I claim:

1. A continuous process for separating a crystallizable component from a liquid multi-component mixture which comprises introducing said mixture under pressure into a cooling zone, cooling said mixture so as to crystallize said component; separating the crystals from the lower melting components of said mixture; passing said crystals into a purification zone so as to form therein a uniform, contiguous mass of crystals; moving said crystals downwardly through said purification zone solely by the combination of the force of gravity and the hydraulic force exerted thereon by said mixture; maintaining the lower end of said purification zone at a temperature at least as high as the melting point of said crystals; melting said crystals in the lower end of said purification zone; displacing a portion of the resulting liquid upwardly through said downwardly gravitating mass of crystals; and removing from the lower end of said purification zone a purified crystallizable material as product.

2. A continuous process for separating a component from a multi-component liquid mixture, said component forming crystals upon cooling said mixture, which comprises introducing said mixture under pressure into a cooling zone and cooling said mixture therein to a temperature such as to form a slurry of said crystals and mother liquor; flowing said slurry into a filter zone and withdrawing therefrom said mother liquor; passing said crystals into an upright elongated purification zone so as to form therein a uniform, contiguous mass of crystals; moving said crystals through said purification zone solely by the combination of the force of gravity and the hydraulic force exerted thereon by said mixture; maintaining the downstream end of said purification zone with respect to the flow of said crystals at a temperature at least as high as the melting point of said crystals; melting said crystals in said downstream end of said purification zone; displacing a portion of the resulting liquid as a reflux stream through said moving mass of crystals so as to intimately contact said crystals; and recovering as a product the remainder of the liquid resulting from the melting of said crystals.

3. The process of claim 2 in which said liquid multi-component mixture comprises isomeric alkyl benzenes.

4. The process of claim 3 in which said mixture contains para-xylene and said para-xylene is recovered as the product.

5. The process of claim 2 in which said liquid multi-component mixture comprises benzene and a paraffinic hydrocarbon and benzene is recovered as the product.

6. The process of claim 2 in which said liquid component mixture comprises cyclohexane and a paraffinic hydrocarbon and cyclohexane is recovered as the product.

7. A continuous process for separating a component from a liquid multi-component mixture, said component forming crystals upon cooling said mixture, which comprises introducing said mixture under pressure into a cooling zone wherein said mixture is cooled to a temperature such as to form a slurry of said crystals and mother liquor; flowing said slurry downwardly into a first filter zone and withdrawing therefrom said mother liquors; passing said crystals downwardly into an upright elongated purification zone so as to form therein a uniform, contiguous mass of crystals; moving said mass of crystals downwardly through said purification zone solely by the combination of gravity and the hydraulic force exerted thereon by said mixture; maintaining the lower end of said purification zone at a temperature at least as high as the melting point of said crystals; melting said crystals in said lower end of said purification zone; displacing a portion of the resulting liquid as a reflux stream upwardly through said downwardly moving mass of crystals so as to intimately contact said crystals; withdrawing said reflux stream from a second filter zone located below said first filter zone; and recovering as a product the remainder of the liquid resulting from the melting of the crystals.

8. A continuous process for separation of a liquid multi-component mixture containing components of different melting points one of which crystallizes first upon lowering the temperature of the mixture so as to form crystals contaminated with at least one other component, which comprises introducing said liquid mixture under pressure into the upper end of a vertically elongated column; passing said mixture through a cooling zone disposed in the upper portion of said column and cooling said mixture to a temperature such as to form a slurry of crystals of one of said components and mother liquor; flowing said slurry downwardly into a filter zone and withdrawing therefrom said mother liquor; passing said crystals downwardly into an elongated purification zone disposed in the lower portion of said column so as to form therein a uniform, contiguous mass of crystals; moving said crystals downwardly through said purification zone solely by the combination of the force of gravity and the hydraulic force exerted by said mixture; maintaining a melting zone in the lower end of said purification zone at a temperature at least as high as the melting point of said crystals; melting said crystals in said melting zone; displacing a portion of the resulting liquid as a reflux stream upwardly through said downwardly moving mass of crystals so as to intimately contact said crystals; and recovering from said melting zone as a product the remainder of the liquid resulting from the melting of said crystals.

9. A process for the separation and purification of at least one of the components of a liquid multi-component mixture which comprises introducing said mixture under pressure into a cooling zone and cooling said mixture therein to a temperature such as to form a slurry of crystals of at least one but not all of said components and mother liquor; flowing said slurry downwardly into a filter zone and withdrawing therefrom said mother liquor; passing said crystals downwardly into an upright elongated purification zone so as to form therein a uniform, contiguous mass of crystals; moving said crystals downwardly through said purification zone solely by the combination of gravity and the hydraulic force exerted thereon by said mixture; maintaining the lower end of said purification zone at a temperature at least as high as the melting point of said crystals; melting said crystals in said lower end of said purification zone; displacing a portion of the resulting liquid as a reflux stream upwardly through said downwardly moving mass of crystals so as to intimately contact said crystals; and recovering as a product the remainder of the liquid resulting from the melting of said crystals.

10. A continuous process for separating a component from a multi-component liquid mixture, said component forming crystals upon cooling said mixture, which comprises introducing said mixture under pressure into a cooling zone and cooling said mixture in its passage therethrough to a temperature such as to form a slurry of said crystals and mother liquor; flowing said slurry into a first filter zone and withdrawing therefrom said mother liquor; recycling at least a portion of said mother liquor to said cooling zone; passing said crystals into an upright elongated purification zone so as to form therein a uniform, contiguous mass of crystals; moving said crystals through said purification zone solely by the combination of the force of gravity and the hydraulic force exerted thereon by said liquid mixture; maintaining the downstream end of said purification zone with respect to the flow of said crystals at a temperature at least as high as the melting point of said crystals; melting said crystals in said downstream end of said purification zone; displacing a portion of the resulting liquid as a reflux stream through said moving mass of crystals so as to intimately contact said crystals; withdrawing said reflux stream from a second filter zone located downstream from said first filter zone with respect to the flow of said crystals; recycling at least a portion of said reflux stream to said cooling zone; and recovering as product the remainder of the liquid resulting from the melting of the crystals.

11. A continuous process for recovering a concentrated solution from a liquid mixture containing a crystallizable solvent which comprises introducing said mixture under hydraulic pressure into a cooling zone and cooling said mixture therein to a temperature such as to form a slurry of crystals and mother liquor; flowing said slurry into a filter zone and withdrawing therefrom said mother liquor; passing said crystals into an upright elongated purification zone so as to form therein a uniform, contiguous mass of crystals; moving said mass of crystals through said purification zone solely by the combination of the force of gravity and the hydraulic force exerted thereon by said liquid mixture; maintaining the downstream end of said purification zone with respect to the flow of said crystals at a temperature at least as high as the melting point of said crystals; melting said crystals in said downstream end of said purification zone; displacing a portion of the resulting liquid as a reflux stream through said moving mass of crystals so as to intimately contact said crystals; withdrawing said reflux stream from said filter zone along with said mother liquor; and controlling the amount of liquid withdrawn from said downstream end of said purification zone so that a solution of desired concentration is recovered from said filter zone.

12. A continuous process for removing water from fruit juice which comprises introducing said fruit juice under hydraulic pressure into a cooling zone and cooling said fruit juice to a temperature such as to form a mixture of ice and concentrated fruit juice; flowing said mixture into a filter zone and withdrawing therefrom said concentrated fruit juice; passing said ice into an upright elongated purification zone so as to form therein a uniform, contiguous mass; moving the mass of ice through said purification zone soley by the combination of the force of gravity and the hydraulic force exerted thereon by said fruit juice; maintaining the downstream end of said purification zone with respect to the flow of said crystals at a temperature at least as high as the melting point of said ice; melting said ice in said downstream end of said purification zone; displacing a portion of the resulting water through the moving mass of ice; and controlling the amount of water withdrawn from said downstream end of said purification zone so that fruit juice of desired concentration is recovered from said filter zone.

13. The process of claim 12 in which said fruit juice is orange juice.

14. The process of claim 12 in which said fruit juice is lemon juice.

15. A continuous process for the separation of a hydrocarbon from a liquid mixture containing said hydrocarbon and other hydrocarbons, said hydrocarbon forming crystals upon cooling said mixture, which comprises, introducing said mixture into a cooling zone under pressure wherein said mixture is cooled to a temperature such as to form a slurry of said crystals and mother liquor; flowing said slurry into a first filter zone and withdrawing therefrom said mother liquor; passing said crystals into an upright elongated purification zone so as to form therein a uniform, contiguous mass of crystals; moving said mass of crystals through said purification zone solely by the combination of the force of gravity and the hydraulic force exerted thereon by said mixture; maintaining the downstream end of said purification zone with respect to the flow of said crystals at a temperature at least as high as the melting point of said crystals; melting said crystals in said downstream end of said purification zone; displacing a portion of the resulting liquid as a reflux stream countercurrent to said moving mass of crystals so as to intimately contact said crystals; withdrawing said reflux stream from a second filter zone located downstream from said first filter zone with respect to the flow of said crystals; and recovering as product the remainder of the liquid resulting from the melting of the crystals.

16. A continuous process for separating a component from a liquid multi-component mixture, said component forming crystals upon cooling said mixture, which comprises introducing said mixture into a cooling zone; passing a liquid refrigerant into said cooling zone under pressure; evaporating said liquid refrigerant and thereby cooling said mixture to a temperature such as to form a slurry of said crystals and mother liquor; flowing said slurry downwardly into a first filter zone and withdrawing therefrom said mother liquor; passing said crystals downwardly into an upright elongated purification zone so as to form therein a uniform, contiguous mass of crystals; moving said mass of crystals downwardly through said purification zone solely by the combination of gravity and the hydraulic force exerted thereon by said mixture; maintaining the lower end of said purification zone at a temperature at least as high as the melting point of said crystals; melting said crystals in said lower end of said purification zone; displacing a portion of the resulting liquid as a reflux stream upwardly through said downwardly moving mass of crystals so as to intimately contact said crystals; withdrawing said reflux stream from a second filter zone located below said first filter zone; and recovering as a product the remainder of the liquid resulting from the melting of the crystals.

17. Apparatus for the separation and purification of crystals which comprises an upright closed tube; a chiller section disposed in the upper part of said tube; a heat exchange means operatively connected to said chiller section, a feed inlet in the upper part of said chiller section; means for introducing feed to said chiller section under pressure; a first filter for separating liquid from crystals positioned intermediate the ends of said tube; a first liquid outlet means connected to said first filter; a second filter for separating liquid from crystals positioned below said first filter; a second liquid outlet means connected to said second filter; a heat exchange means disposed in the lower end of said tube; and a liquid outlet in the lower end of said tube.

18. Apparatus for the separation and purification of crystals which comprises an upright closed tube; a jacket encompassing the upper portion of said tube so as to form an annular space between said jacket and said tube; means for introducing liquid into the upper part of said tube under pressure; a refrigerant inlet means in the lower part of said jacket; a refrigerant outlet means in the upper part of said jacket; a vertical shaft centrally disposed within said tube; a plurality of scraper blades attached to said shaft, said blades being adapted to remove crystals from the walls of that part of the tube encompassed by said jacket; a first filter for separating liquid from crystals positioned intermediate the ends of said tube; a first liquid outlet means connected to said first filter; a second filter for separating liquid from crystals positioned below said first filter; a second liquid outlet means connected to said second filter; a heat exchange means disposed in the lower end of said tube; and a liquid outlet in the lower end of said tube.

19. Apparatus for the separation and purification of crystals which comprises an upright closed tube; a feed inlet in the upper part of said tube; means for introducing feed to said tube under pressure; means for introducing a refrigerant into the upper portion of said tube; means for withdrawing gaseous refrigerant from the upper portion of said tube; a first filter for separating liquid from crystals positioned intermediate the ends of said tube; a first liquid outlet means connected to said first filter; a second filter for separating liquid from crystals positioned below said first filter; a second liquid outlet means connected to said second filter; a heat exchange means disposed in the lower end of said tube; and a liquid outlet in the lower end of said tube.

References Cited in the file of this patent
UNITED STATES PATENTS

| | | |
|---|---|---|
| Re. 23,810 | Schmidt | Mar. 30, 1954 |
| 2,315,762 | Ax et al. | Apr. 6, 1943 |
| 2,540,977 | Arnold | Feb. 6, 1951 |
| 2,603,667 | Pankratz | July 15, 1952 |
| 2,615,794 | Shelby | Oct. 28, 1952 |
| 2,617,274 | Schmidt | Nov. 11, 1952 |
| 2,659,761 | Frevel et al. | Nov. 17, 1953 |
| 2,731,456 | Weedman | Jan. 17, 1956 |
| 2,747,001 | Weedman | May 22, 1956 |
| 2,765,921 | Green | Oct. 9, 1956 |
| 2,791,333 | McKay | May 7, 1957 |